Feb. 13, 1940.  R. D. INSKO  2,189,904
HYDRAULIC BRAKE FOR MOTORCYCLES AND BICYCLES
Filed May 6, 1938  2 Sheets-Sheet 1
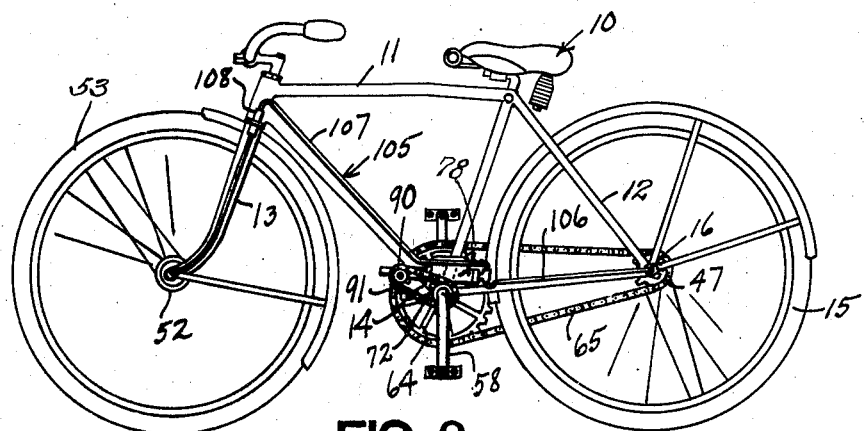
INVENTOR.
Robert D. Insko Feb. 13, 1940.  R. D. INSKO  2,189,904
HYDRAULIC BRAKE FOR MOTORCYCLES AND BICYCLES
Filed May 6, 1938  2 Sheets-Sheet 2
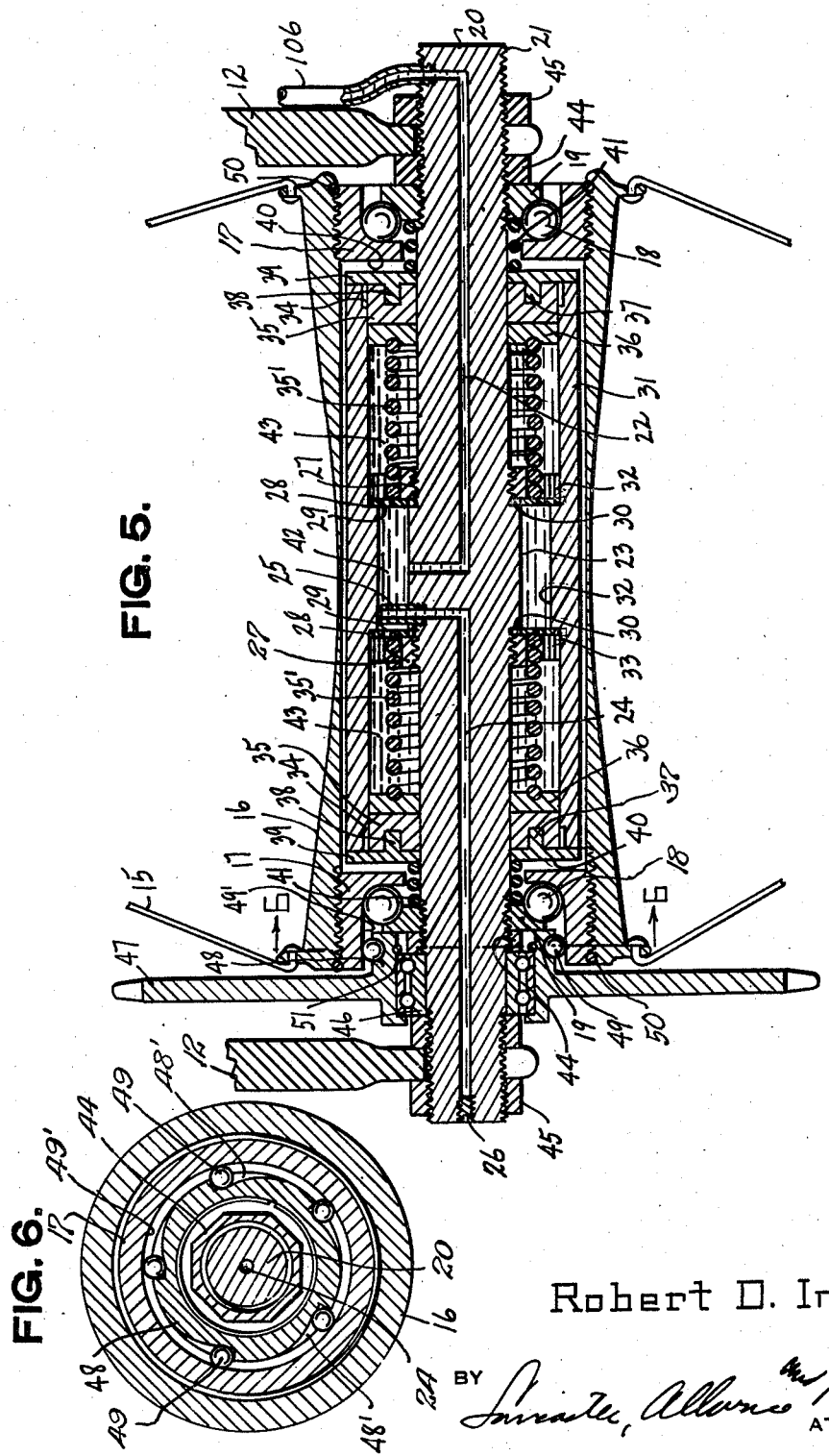
INVENTOR.
Robert D. Insko
BY
ATTORNEYS.

Patented Feb. 13, 1940

2,189,904

UNITED STATES PATENT OFFICE 2,189,904

HYDRAULIC BRAKE FOR MOTORCYCLES AND BICYCLES

Robert D. Insko, Paris, Ky.

Application May 6, 1938, Serial No. 206,454

4 Claims. (Cl. 192—5)

The invention relates to improvements in hydraulic brakes for vehicles, such as bicycles and motorcycles, and an important object of the invention is to provide a brake which is operated by back-pedaling.

Another object of the invention is to provide individual hydraulic brakes for each wheel of a bicycle, operable by back-pedaling.

Still another object of the invention is to provide two opposed brake members in each wheel, the brake members of all the wheels being applied with equal force.

A further object is to provide a hydraulic brake disposed within the hub portion of a wheel and means exteriorly of the hub portion for operating the brake.

A still further object of the invention resides in the provision of fluid inlet and outlet conduits in the axle of a hub-enclosed hydraulic brake.

Other objects and advantages of the invention will become apparent during the course of the following detailed description, taken in connection with the accompanying drawings, forming a part of this specification, and in which drawings:

Figure 1 is a side elevation of a bicycle equipped with the back-pedaling brake mechanism.

Figure 2 is a longitudinal vertical sectional view of a hydraulic pump preferably employed to supply fluid to the hydraulic brakes.

Figure 3 is a transverse vertical sectional view of a pedal-actuated crank and showing the manner in which it is rotatably supported in the frame of the bicycle.

Figure 4 is a vertical sectional view taken substantially on the line 4—4 of Figure 3.

Figure 5 is a transverse vertical sectional view of a hydraulic brake and rear hub of a bicycle wheel.

Figure 6 is a vertical sectional view taken substantially on the line 6—6 of Figure 5.

In the drawings, which for the purpose of illustration show only a preferred embodiment of the invention, and wherein similar reference characters denote corresponding parts throughout the several views, 10 designates a bicycle including a frame 11, provided with a rear fork 12, a pivotal front fork 13 and a crank hanger 14.

In the rear fork 12 is secured a rear wheel 15 provided with a hub 16, as shown in Figure 5, having threaded cones 17 in its opposite ends, rolling upon balls 18 supported by threaded cones 19 at opposite end portions of a stationary axle 20. Leading from an outer end portion 21 of the axle is a passageway 22 terminating in the periphery of an annular enlargement 23 intermediate the ends of the axle. A second passageway 24 extends between the opposite end of the axle and a tube 25 projecting upwardly of the annular enlargement 23, and this passageway is provided with a removable plug 26. Secured against opposite shoulders of the annular enlargement 23, as by nuts 27 are annular discs 28 provided with perforations 29. These discs are secured against rotation on the axle as by splines 30. Between the hub 16 and axle 20 is a cylinder 31 having an interior annular enlargement 32 intermediate its ends, against which the annular discs 28 are seated, and the cylinder is secured against rotation relative to the discs as by splines 33. Secured for axial non-rotative motion relative to opposite ends of the cylinder, as by splines 34, are opposed annular pistons 35 between the axle and cylinder and each urged outwardly from the center of the cylinder as by an expansion coil spring 35', encircling the axle and bearing upon an annular seat 36 inwardly of the piston. In the outer face of each piston, there is provided an annular channel or groove 37 in which is disposed the annular tongue portion 38 of a brake disc 39 normally held in spaced adjacent relation to the inner surface 40 of one of the cones 17, as by an expansion coil spring 41 encircling the axle and seating against one of the cones 19. This arrangement of the cylinder provides a central chamber 42 and opposite chambers 43 in communication with the central chamber. The cones 19 may be held in adjusted relation as by locknuts 44 outwardly of which the opposite sides of the rear fork 12 are secured as by lock-nuts 45. Rotatably mounted at one end of the axle, as by a double-row annular ball bearing member 46, is a sprocket 47 having an annular flange 48 disposed in inwardly concentric relation to a cylindrical wall portion 49' forming an extension of one of the cones 17. In the flange 48 there is formed a plurality of concavities 48' of gradually increasing depth and each carrying a ball 49 adapted to freely ride upon the cylindrical wall portion 49', upon rotation of the sprocket in one direction, and to bind against the wall portion 49', upon rotation of the sprocket in a reverse direction. In the example shown, five concavities and five balls are provided, and with this arrangement there will always be one ball ready for instant binding engagement upon such reverse rotation. Locking rings 50 may be employed to retain the cones 17 in position, and a locking ring 51 may also serve to secure the bearing member 46 interiorly of the sprocket. The hub and brake construction 52 for the front wheel 53 is the same as the hub and brake construction of the rear wheel with the exception that the sprocket 47, together with the bearing member 46 and the balls 49 are omitted.

Within each end portion of the crank hanger 14 is threaded an outer cone 54 carrying balls 55 and inner cones 56 and 57, as shown in Figure 3. A two-part crank 58 is provided. One crank section 59 is formed with an axle 60 having fixed, on its inner end portion 61, as by a key 62 and nut 63, a sprocket 64 about which is trained a drive chain 65 to the rear wheel sprocket 47. The nut 63 engages the cone 56, and a shoulder 65', formed by reducing the free end portion 66 of the axle, engages the cone 57. Fixed on this free end portion, as by a key 67, is an annular sleeve 68, provided with a circumferential series of concavities 69 of graduated depth, as shown in Figure 4. In these concavities are disposed balls 70 contacting the interior of a cylindrical flange 71 forming a part of a sprocket 72. These balls are adapted to clutch or bind against the flange 71 upon movement of the axle 60 in a back-pedaling direction and to ride freely with respect to the flange upon movement of the axle in a forward-pedaling direction. In the example shown, five concavities 69 and five balls 70 are provided. The remaining crank section 73 is fixed upon a tapered surface 74 of the free end portion of the axle, as by a key 75 and nut 76. Disposed between the flange 71 and the crank hanger is a double-row annular ball bearing 77.

Mounted upon the crank hanger portion of the frame is a fluid pump 78, as shown in Figures 1 and 2. This pump 78 may include a cylinder 79 provided with a piston 80 having a reduced stem portion 81 terminating in a socket 82 encirclingly engaging a head 83 threadedly secured to the reduced end portion 84 of a rack 85. This rack is reciprocably carried within a tubular housing 86 having a threaded end 87 detachably secured to the cylinder. Rotatably journaled in the housing 86 is a shaft 88 having fixed on one end a pinion 89 meshing with the rack, and having fixed on its opposite end a sprocket 90 about which is trained a chain 91 to the sprocket 72. Encircling the reduced end portion 84 of the rack is an expansion coil spring 92, one end of which engages a shoulder 93 on the rack and the other end of which engages an annular bushing 94 threaded within the tubular housing. Threaded into the end 95 of the cylinder is a plug 96 provided with an outlet orifice 97 leading to a threaded socket 98. Disposed between the head of the piston 80 and the plug 96 is an expansion coil spring 99 bearing against a cupped washer 100 at the end of the spring adjacent the piston, and against a perforated dome-shaped shell 101 adjacent the plug 96. These springs urge the piston toward a normally retracted position wherein a fluid reservoir 102 surmounting the cylinder communicates with portions of the cylinder at opposite sides of the piston 80, as by apertures 103. The reservoir is provided with a removable filler cap 104.

In the threaded socket 98 of the cylinder plug is secured the end of a tubular conduit 105 provided with a branch 106 extending rearwardly along the frame of the bicycle to the passageway 22 of the rear wheel axle, and a branch 107 extending forwardly and upwardly of the frame to the pivotal front fork 13 and downwardly along one side of the fork to the front wheel axle. The branch 107 includes a flexible section 108, such as a short length of rubber tubing, at the juncture of the pivotal front fork and the frame, as shown in Figure 1.

In the operation of the bicycle, forward pedaling movement of the crank axle 60 will rotate the sprocket 64 but will not affect the sprocket 72. The motion of the sprocket 64 will be imparted through the chain 65 to the rear wheel sprocket 47 in a direction to effect engagement of the ball clutch 49 with the hub 16, whereby to turn the rear wheel and propel the bicycle in a forward direction.

Back-pedaling movement of the crank axle 60 will impart a reverse motion to the sprocket 64 and likewise to the rear wheel sprocket 47, disengaging the ball clutch 49. Simultaneously the sprocket 72 and the crank axle 60 will, through the ball clutch 70, become connected, whereby to impart motion, through the chain 91 to the sprocket 90, pinion 89, rack 85 and piston 80, overcoming the resistance of the springs 92 and 99, and pumping a charge of fluid through the conduit 105 to the front and rear axles. The flow of fluid through the passageways 22 of each axle to the cylinders 31 of each wheel, will force the pistons 35 and discs 39 outwardly into frictional braking engagement with the surfaces 40 of the hub cones 17.

When the system is first placed in operation, the plug 26 is removed to permit the escape of air from the cylinder through the passageway 24, upon back-pedaling.

Further back-pedaling will cause the brake fluid to bleed from the passageway 24, thereby indicating that all the air has been evacuated from the system, and at this time the plug 26 is replaced, and the brakes are ready for operation.

Various changes may be made in the form of invention herein shown and described, without departing from the spirit of the invention or the scope of the following claims.

I claim:

1. In a vehicle, a stationary axle, a wheel including a hub rotatable on the axle, a first sprocket rotatable on the axle, clutch means engaging the sprocket and hub upon movement of the sprocket relative to the hub in a given direction, braking means, a hydraulic motor in the hub arranged to actuate the braking means, a crank including a shaft rotatably carried by the vehicle, a second sprocket fixed to the shaft, a first chain transmitting movement of the second sprocket to the first sprocket, a third sprocket on the shaft, clutch means engaging the shaft and the third sprocket upon movement of the shaft relative to the third sprocket in a direction opposite to the given direction, a hydraulic pump, a fluid conduit connecting the pump and motor, means actuating the pump including a fourth sprocket, and a second chain transmitting movement of the third sprocket to the fourth sprocket.

2. In a hydraulically operated brake, an axle, a hub, bearing cones fixed at opposite ends of the hub for rotatably supporting the hub on the axle, a cylinder encircling the axle within the hub, pistons one at each end portion of the cylinder and splined for movement longitudinally of the axle into engagement with the cones, and means introducing a fluid into the cylinder between the pistons.

3. In a hydraulically operated brake, an axle, a hub, bearing cones fixed at opposite ends of the hub for rotatably supporting the hub on the axle, a cylinder encircling the axle within the hub, and pistons one at each end portion of the cylinder and splined for movement longitudinally of the axle into engagement with the cones, said axle being provided with a fluid passageway leading from its outer end portion to a portion within the cylinder.

4. In a hydraulically operated brake, an axle, a hub, bearing cones fixed at opposite ends of the hub for rotatably supporting the hub on the axle, a cylinder encircling the axle within the hub, and pistons one at each end portion of the cylinder and splined for movement longitudinally of the axle into engagement with the cones, said axle being provided with a fluid passageway leading from its outer end portion to a portion within the cylinder and with a second normally closed fluid passageway from a portion within the cylinder to an outer end portion of the axle.

ROBERT D. INSKO.